Jan. 9, 1951  H. C. WALLIN  2,537,495
AIR HUMIDIFIER FOR INTERNAL-COMBUSTION ENGINES
Filed Aug. 13, 1947  2 Sheets—Sheet 1
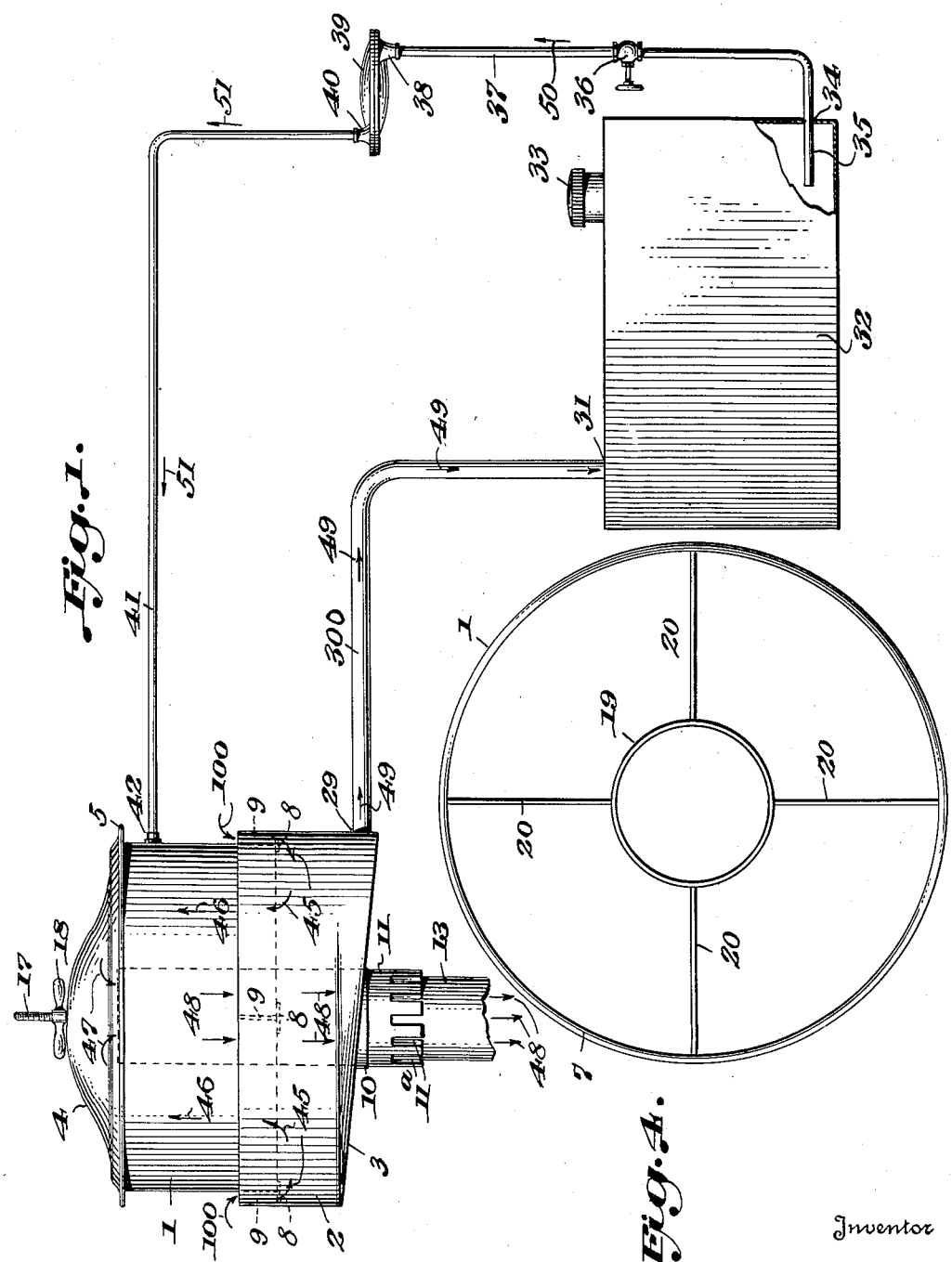
Inventor
Horace C. Wallin,
By Mason & Hatfield
Attorneys.

Jan. 9, 1951            H. C. WALLIN            2,537,495
AIR HUMIDIFIER FOR INTERNAL-COMBUSTION ENGINES
Filed Aug. 13, 1947            2 Sheets-Sheet 2
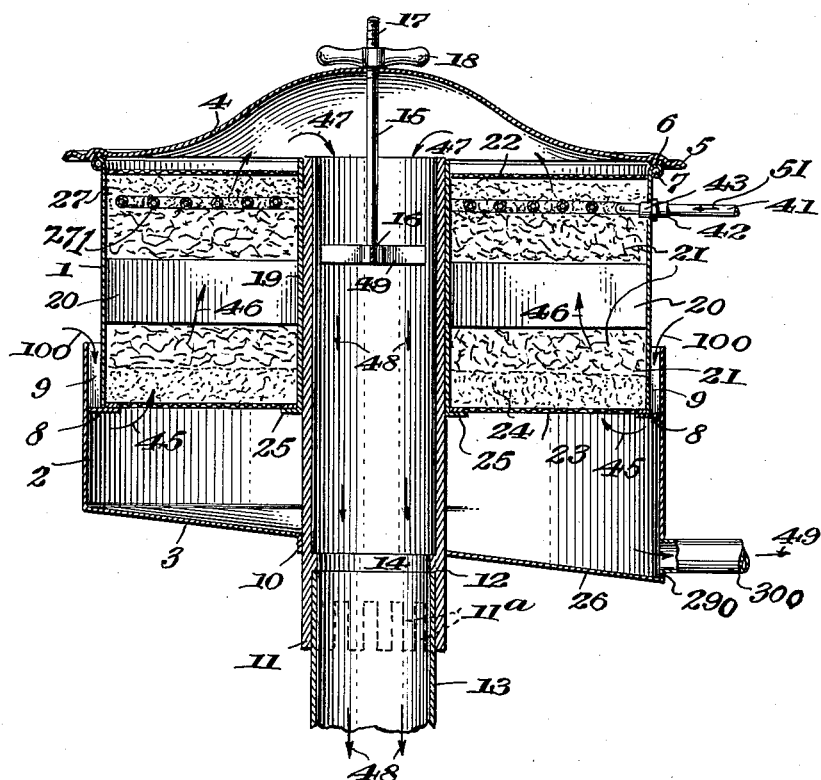
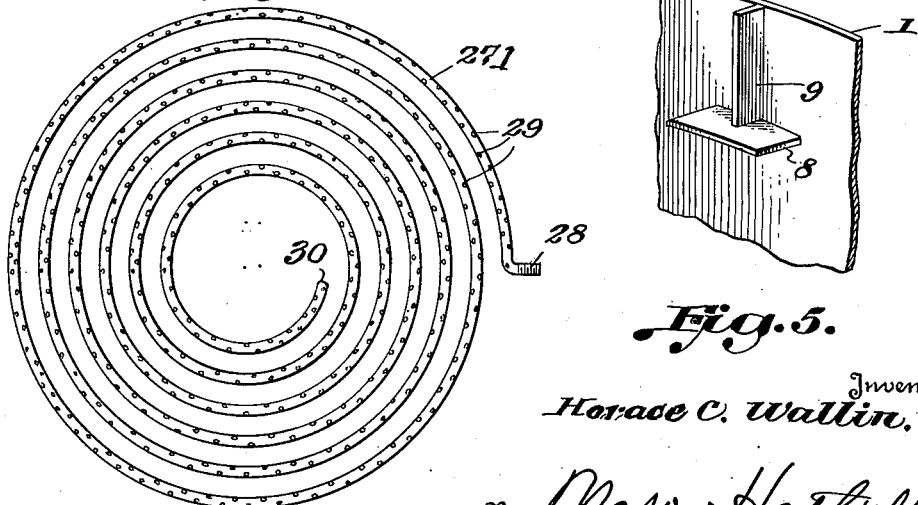
Inventor
Horace C. Wallin.
By Mason & Hatfield
Attorneys.

Patented Jan. 9, 1951

2,537,495

UNITED STATES PATENT OFFICE 2,537,495

AIR HUMIDIFIER FOR INTERNAL-COMBUSTION ENGINES

Horace C. Wallin, Big Spring, Tex., assignor of one-third to Lloyd D. Gilbert and one-third to John T. Johnson, both of Big Spring, Tex.

Application August 13, 1947, Serial No. 768,379

2 Claims. (Cl. 183—9)

This invention relates to a device for use with internal combustion engines and is particularly addressed to a filter for adding the proper amount of moisture to air prior to when the air is admitted to the carburetor.

An object of the invention is to provide a device for humidifying air for internal combustion engines especially constructed and adapted for use in hot dry climates.

A further object of the invention is to provide a humidifier for internal combustion engines provided with means for removing all foreign particles which otherwise might be taken into the carburetor of the engine.

A further object of the invention is to provide a combined air cleaner and humidifier which will admit the proper amount of moisture to the carburetor thereby giving smoother motor performance and furnishing more power to the motor as well as increasing gasoline mileage.

An additional object of the invention is to provide a humidifier for engines having means for constantly passing water over layers of filtering material to thereby carry off dust and foreign matter extracted from the air by the material.

Another object of the invention is to provide a device of the kind described which is inexpensive to manufacture and which provides ready means for cleaning the filtering material or renewing the same.

An additional object of the invention is to provide a device for water washing the air before its entrance into the carburetor of a motor adapted particularly for increasing the efficiency of an engine during the hotter hours of the day, and when driving in higher and drier climates such as may be experienced in the western part of Texas and other States.

Another object of the invention is to provide in an air humidifier for engine carburetors a casing having a plurality of layers of filtering material, certain of the layers being of different porosity and otherwise having other filtering qualities.

Other objects will appear hereinafter throughout the specification.

In the drawings:

Figure 1 is a side elevational view showing the apparatus of this invention and how it may be attached to the intake of an automobile carburetor.

Figure 2 is a vertical sectional view of the filter unit and showing means for connecting the same to the carburetor intake conduit.

Figure 3 is a detail plan view of the coiled spreader pipe located in the filter unit.

Figure 4 is a detail top plan view of the spider located within the filter unit, and Figure 5 is a detailed showing of the spacer and supporting means for the upper half of the filter unit.

As shown in the drawings numeral 1 indicates the upper section of the filter unit, the lower section being indicated by the numeral 2.

The lower section is provided with an inclined bottom portion 3 and the upper section is provided with a cap 4. As indicated all of these parts are preferably constructed of sheet metal. Inwardly spaced from the periphery 5 is a concave depression in the cap for the reception of the washer 6, constructed of rubber or similar resilient material. The washer 6 bears against the spun top portion 7 of the upper section 1. The numerals 8 and 9 indicate, respectively, a flange and a spacing member rigidly connected to the inner side of the lower section at spaced intervals, as shown in Figures 1 and 2. The flanges 8 form a suitable support for the upper section and the spacing members 9 provide a space for the entrance of air, indicated by the arrow 100. The lower section is provided with a flange 10 which partially encircles the collar 11, as shown in Figure 1. The lower end of the collar 11 is notched and is indicated at 11a, so that it may fit over and frictionally engage the upper end of the carburetor intake pipe 13. The upper end of this pipe is indicated at 12. The interior of the collar 11 is provided with a circular flange 14 which is adapted to act as a stop when the collar is sleeved on the pipe 13.

The cap 4 is held in position, as indicated in Figures 1 and 2, by a rod 15 whose lower end 16 is attached to a spider 49 which is rigidly mounted within the interior of the collar. The upper end of rod 15 is screw threaded, as indicated at 17. This screw threaded end is adapted to be forced through an aperture centrally located in cap 4, as indicated in Figure 2 and is held on the rod by a wing nut indicated at 18 that screw-threadedly engages the rod 15. The upper section 1 of the filter unit is provided with a collar 19 which is held rigid with the outer cylindrical portion 1 by means of the radiating arms 20 that may all be rigidly connected to each other by welding or brazing, etc., the unit being indicated as a whole in Figure 4. Located above and below, as well as between the arms 20 is a filter layer 21 composed preferably of loose wooden chips. Is has been found that aspen chips are particularly efficacious for this purpose as they readily absorb moisture and permit the ready transfer of moisture contained in them to the air passing through this filter layer. There is an upper screen 22 and a lower screen 23, both composed of meshed wire, preferably copper wire. Located between the lower mesh screen 23 and the filter layer 21 is a comparatively shallow layer of metal filings, preferably copper wool 24. Similarly located above the layer 21 is a second layer of mineral wool 27, such as copper wool. Interposed between the upper layer 27 and the layer 21 is a coiled spreader pipe 271, the coils of which lie in a single plane. The outer end is provided with a right-angled screw threaded portion 28 and the inner end is closed, as indicated at 30. Intermediate these ends are a plurality of perforations 29, all as indicated in Figure 3.

Collar 19 has a flange 25 which forms a support for the lower screen 23 as shown in Figure 2. The bottom portion 3 of the lower section has a lowermost slanting floor 26 upon which all moisture which trickles through the lowermost screen 23 drains, and connected adjacent this floor through the side wall of the lower section is an aperture 290 into which extends the drain pipe 390. This pipe connects at 31 to a tank 32. The top of this tank is provided with the usual filler opening 33 and one of the side walls is provided with an aperture 34 into which extends the lower angled end 35 of the pipe 37 which is provided with a hand operated valve 36 for closing, or partially closing, the passage of fluid through said pipe. The upper end of the pipe is provided with a fitting 38 that may be connected to a pressure motor similar to a double diaphragm fuel pump in the usual automobile internal combustion engine, as indicated diagrammatically at 39. This motor is provided with suitable connections (not shown) to the intake manifold of the engine. Fluid pumped by this motor from tank 32 through pipe 37 is forced through fitting 40 and pipe 41 to fitting 42 having a collar 43 that extends through the side wall of the upper section and is screw-threadedly engaged with the end 28 of coiled spreader pipe 271, as shown in Figure 2.

Air enters the filtering unit at all points circumferentially between the upper and lower section in the space defined by the spacing members 9. This air then changes direction, as indicated by arrows 45, and moves upwardly through the first layer of metal wool 24. The metal wool retains some of the moisture that moves downwardly through the several layers of filtering material. The air, partially moisturized, moves through the comparatively thick layer of wood chips, such as aspen wood chips, as indicated by the arrows 46. After the air has passed through the thickened filter layer 21 it passes through a comparatively dry layer 27 of metal wool. As indicated by arrows 47 the air then passes substantially vertically downwardly through the collar 11, as indicated by arrows 48, into the carburetor intake pipe 13 and thence into the carburetor (not shown).

Water which passes through the perforations 29 saturates the wood chips contained in the layer 21 and is at least partially held upon the surfaces of the metal wool forming the lower layer 24. Any excess water drips to the inclined bottom 3 and finds its way to the slanting floor 26 and into the pipe 390 where it returns to the reservoir. It is drawn from the reservoir by means of the pipe 37 to the motor 39, as indicated by the arrows 50 and is forced upwardly in pipe 41 by the pump, as indicated by arrows 51 and forced into the coiled spreader coil 271. The amount of water passing through this circuit may be regulated by the valve 36. Should the atmosphere be particularly dry, such as would occur when making a trip through an arid region, valve 36 may be opened to permit a substantially free flow of water in the circuit. During the rainy season or when the weather is damp, the valve may often be partially closed. It will be understood that ready access to the several layers of filtering material, for purposes of cleaning or replacement, may be had by removing the wing nut 18 that allows the removing of the cap 4 and upper screen 22.

The wing nut removed, the entire upper section, namely all parts resting upon the flange 8, may be removed as a unit for cleaning, repair or replacement purposes. It will also be understood that mounting of the collar 11 with its notches 11a permits the ready assembly of the filter unit on the carburetor intake 12. In most instances, but depending upon the make of car with which the device is used, no modification of the carburetor intake is necessary.

It will be appreciated that other pumping means may be substituted for the diaphragm fuel pump shown in the drawings such as the provision of a centrifugal pump or a pump driven by an electric motor from the automobile battery (not shown).

The preferred embodiments having been fully described, what I claim is new and desire to secure by Letters Patent is:

1. In combination, means for supplying moist air to the carburetor of an internal combustion engine comprising a filter unit, means for mounting said unit on the intake pipe of an engine carburetor, said unit comprising upper and lower sections, filter means in said upper section comprising a plurality of layers of comminuted material, means spacing said sections laterally to provide an entrance for air between the walls of said sections, means comprising a perforated coil spreader pipe extending substantially the width of said upper section for evenly distributing fluid through all of said layers with the exception of one layer, said pipe being positioned between said one layer and the remaining layers of material, and means directing the incoming air into all of the layers, said spacing means being mounted on the inner wall of said lower section whereby to support and laterally space the walls of the upper section on the walls of the lower section, said last named means including a plurality of supporting flanges and spacing members, each flange and spacing member forming a substantially inverted T, each T being spaced circumferentially from another T.

2. In combination, means for supplying moist air to the carburetor of an internal combustion engine comprising a filter unit, means for mounting said unit on the intake pipe of an engine carburetor, said unit comprising upper and lower sections, filter means in said upper section comprising a pair of perforated screens and a plurality of layers of comminuted material positioned therebetween, said lower section being of greater diameter than said upper section, means spacing said sections laterally to provide an entrance for air between the walls of said sections, means comprising a perforated coil spreader pipe extending substantially the width of said upper section for evenly distributing fluid through all of said layers with the exception of one layer, said pipe being positioned between said one layer and the remaining layers of material, and means directing the incoming air into all of the layers, said spacing means being mounted on the inner wall of said lower section whereby to support and laterally space the walls of the upper section on the walls of the lower section, said last named means including a plurality of supporting flanges and spacing members, each flange and spacing member forming a substantially inverted T, each T being spaced circumferentially from another T, said one layer serving to absorb moisture from said air prior to its passage into the intake pipe of a carburetor.

HORACE C. WALLIN.

REFERENCES CITED

The following references are of record in the file of this patent:

UNITED STATES PATENTS

| Number | Name | Date |
|---|---|---|
| 221,232 | Hirsh | Nov. 4, 1879 |
| 258,451 | Mallet | May 23, 1882 |
| 566,415 | Schroeder | Aug. 25, 1896 |
| 1,619,029 | Morris | Mar. 1, 1927 |
| 1,766,124 | Hendrickson | June 24, 1930 |
| 1,848,576 | Sandel | Mar. 8, 1932 |
| 1,851,427 | Hinkle | Mar. 29, 1932 |
| 2,018,755 | Zander | Oct. 29, 1935 |
| 2,151,593 | Glanzer | Mar. 21, 1939 |
| 2,160,549 | Kurth | May 30, 1939 |
| 2,180,411 | Graham | Nov. 21, 1939 |
| 2,184,833 | Dewey | Dec. 26, 1939 |
| 2,186,152 | Seitz | Jan. 9, 1940 |
| 2,277,552 | Kneedler | Mar. 24, 1942 |
| 2,343,797 | Phillips | Mar. 7, 1944 |